US009969382B2

(12) United States Patent
Ogawa

(10) Patent No.: US 9,969,382 B2
(45) Date of Patent: May 15, 2018

(54) MOVING ASSIST APPARATUS AND METHOD AND DRIVING ASSIST SYSTEM

(71) Applicant: TOYOTA JIDOSHA KABUSHIKI KAISHA, Toyota-shi (JP)

(72) Inventor: Yuki Ogawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/120,926

(22) PCT Filed: Jan. 30, 2015

(86) PCT No.: PCT/IB2015/000091
§ 371 (c)(1),
(2) Date: Aug. 23, 2016

(87) PCT Pub. No.: WO2015/124978
PCT Pub. Date: Aug. 27, 2015

(65) Prior Publication Data
US 2016/0362097 A1 Dec. 15, 2016

(30) Foreign Application Priority Data
Feb. 24, 2014 (JP) ................................. 2014-033466

(51) Int. Cl.
*B60W 20/12* (2016.01)
*B60W 10/06* (2006.01)
(Continued)

(52) U.S. Cl.
CPC ............ *B60W 20/12* (2016.01); *B60W 10/06* (2013.01); *B60W 10/08* (2013.01); *B60W 10/26* (2013.01);
(Continued)

(58) Field of Classification Search
CPC ...... B60W 20/12; B60W 10/26; B60W 10/08; B60W 10/06; B60W 50/0097; B60W 2250/402; Y10S 903/93; Y02T 10/6291
See application file for complete search history.

(56) References Cited

U.S. PATENT DOCUMENTS

| 2012/0010768 | A1 | 1/2012 | Phillips et al. |
| 2014/0095003 | A1 | 4/2014 | Phillips et al. |
| 2015/0039169 | A1 | 2/2015 | Dextreit |

FOREIGN PATENT DOCUMENTS

| EP | 2 689 982 A1 | 1/2014 |
| JP | 2007-50888 A | 3/2007 |

(Continued)

OTHER PUBLICATIONS

International Search Report dated Jun. 3, 2015, in PCT/IB2015/000091 filed Jan. 30, 2015.

*Primary Examiner* — Anne M Antonucci
(74) *Attorney, Agent, or Firm* — Oblon, McClelland, Maier & Neustadt, L.L.P.

(57) ABSTRACT

A moving assist apparatus assists vehicle which includes an internal combustion engine and an electric motor as driving source to move from current position to destination. The moving assist apparatus includes: a mode planning unit of for each section obtained by dividing traveling route from the current position to the destination, planning regularly one traveling mode from EV mode of not maintaining charge storage amount of battery and HV mode of maintaining the charge storage amount of battery; and an information generation unit of generating periodically traveling load information referenced by the mode planning unit. In addition to plans regularly, when replanning the traveling mode based on the traveling load information generated by the information generation unit, the mode planning unit defers execution of the replanning of traveling mode period (Continued)

to which from execution of the previous planning does not reach predetermined period.

7 Claims, 6 Drawing Sheets

(51) Int. Cl.
   *B60W 10/08* (2006.01)
   *B60W 10/26* (2006.01)
   *B60W 50/00* (2006.01)

(52) U.S. Cl.
   CPC ... *B60W 50/0097* (2013.01); *B60W 2550/402* (2013.01); *Y02T 10/6291* (2013.01); *Y10S 903/93* (2013.01)

(56) References Cited

FOREIGN PATENT DOCUMENTS

| | | |
|---|---|---|
| JP | 2009-12605 A | 1/2009 |
| JP | 2015-157565 A | 9/2015 |
| WO | WO 2013/110709 A | 8/2013 |

MOVING ASSIST APPARATUS AND METHOD AND DRIVING ASSIST SYSTEM

BACKGROUND OF THE INVENTION

1. Field of the Invention

The invention relates to a moving assist apparatus and a moving assist method which manage an application of a plurality of traveling modes of a vehicle, as well as a driving assist system.

2. Description of Related Art

As the vehicle comprising the plurality of traveling modes as described above, a hybrid vehicle using an internal combustion engine and an electric motor as a driving source is known. The hybrid vehicle has, as the plurality of traveling modes, a first mode (EV mode) in which EV traveling only using the electric motor and stopping the internal combustion engine while not maintaining a charge storage amount in a battery is given priority; a second mode (HV mode) in which HV traveling using the internal combustion engine and the electric motor while maintaining the charge storage amount in the battery is given priority; and the like. Further, a moving assist apparatus including a navigation system and the like mounted on the hybrid vehicle may provide assistance, such as calculating a traveling route from a current position to a destination based on map information, road traffic information and the like and selecting a traveling mode applied to each section of the traveling route. For example, an example of a vehicle control apparatus having such a moving assist function is described in Japanese Patent Application Publication No. JP 2009-12605 (JP 2009-12605).

In the vehicle control apparatus described in JP 2009-12605, a mode planning unit (traveling mode setting unit) of planning a traveling mode for each section of the traveling route and an information generation unit (average speed detection unit and the like) of generating information for planning the traveling mode are provided. The information generation unit is a unit of regenerating the information in a predetermined period. Further, the mode planning unit is a unit of replanning the traveling mode in a different predetermined period from that of the information generation unit, and when the information is regenerated by the information generation unit, updating, that is, replanning the traveling mode based on the regenerated information. Therefore, if the period of replanning the traveling mode by the mode planning unit is close in time to the period of generating information by the information generation unit, the interval according to which the mode planning unit replans the traveling mode is shortened, which sometimes may give discomfort to a driver.

In addition, this issue is a common problem in the apparatus and method of allocating traveling modes to a target vehicle including a plurality of traveling modes of different energy balances.

SUMMARY OF THE INVENTION

Therefore, there is provided a moving assist apparatus and a moving assist method, which can suppress discomfort due to replanning of a traveling mode, as well as a driving assist system having the moving assist function.

According to a first aspect of the invention, there is provided a moving assist apparatus for assisting a vehicle which includes an internal combustion engine and an electric motor as a driving source to move from a current position to a destination. The moving assist apparatus includes: a mode planning unit configured to, for each section obtained by dividing a traveling route from the current position to the destination, plan regularly or irregularly one traveling mode from a first mode of not maintaining a charge storage amount of a battery and a second mode of maintaining the charge storage amount of the battery, based on a traveling load associated with the section; and an information generation unit configured to generate periodically traveling load information that is referenced by the mode planning unit, wherein, the mode planning unit is configured to, when replanning the traveling mode based on the traveling load information generated by the information generation unit, defer an execution of the replanning of the traveling mode a period to which from an execution of the previous planning does not reach a predetermined period, in addition to plan regularly.

According to a second aspect of the invention, there is provided a moving assist method for assisting a vehicle which includes an internal combustion engine and an electric motor as a driving source when it moves from a current position to a destination, which includes: for each section obtained by dividing a traveling route from the current position to the destination, planning regularly or irregularly, by a mode planning unit, one traveling mode from a first mode of not maintaining a charge storage amount of a battery and a second mode of maintaining the charge storage amount of the battery, based on a traveling load associated with the section; and generating periodically, by an information generation unit, traveling load information that is referenced by the mode planning unit. The moving assist method includes, when replanning the traveling mode based on the traveling load information generated by the information generation unit, deferring, by the mode planning unit, an execution of the replanning of the traveling mode a period to which from an execution of the previous planning does not reach a predetermined period, in addition to planning regularly.

According to the above aspects, the execution of replanning of the traveling mode the period to which from the execution of the previous planning does not reach the predetermined period such as a predetermined time or a predetermined distance is deferred. That is, the replanning of the traveling mode is not executed until the predetermined period from the execution of the previous planning has elapsed. Therefore, the traveling mode will not be changed in a short period, and the discomfort due to the replanning of the traveling mode can be suppressed.

In the above first aspect, the mode planning unit may defer the replanning of the traveling mode the period to which from the execution of the previous planning does not reach the predetermined period, by prohibiting outputting the traveling load information generated by the information generation unit that urges the replanning of the traveling mode the period to which from the execution of the previous planning does not reach the predetermined period.

According to the above aspect, even the information generation unit generates the traveling load information, if the period from the execution of the previous planning by the mode planning unit does not reach the predetermined period, the outputting of the generated traveling load information is prohibited. In other words, during the predetermined period from the execution of the previous planning, the traveling load information is not output from the information generation unit to the mode planning unit, and the replanning of the traveling mode caused by receipt of the traveling load information can be reliably deferred.

In the above first aspect, the mode planning unit may defer the replanning of the traveling mode the period to which from the execution of the previous planning does not reach the predetermined period, by prohibiting generating the traveling load information generated by the information generation unit that urges the replanning of the traveling mode the period to which from the execution of the previous planning does not reach the predetermined period.

According to the above aspect, if the period from the execution of the previous planning by the mode planning unit does not reach the predetermined period, the generating itself of the traveling load information in the information generation unit is prohibited. In other words, during the predetermined period from the execution of the previous planning, no information is generated, and in this case the replanning of the traveling mode caused by receipt of the traveling load information can be reliably deferred.

In the above first aspect, a condition that the mode planning unit replans irregularly the traveling mode includes any one of conditions that a remaining amount of the battery has changed by more than a predetermined amount, that an operating state of an air conditioner is changed, and that it is the case that a current traveling mode shall be changed.

In the above second aspect, a condition that the mode planning unit replans irregularly the traveling mode includes any one of conditions that a remaining amount of the battery has changed by more than a predetermined amount, that an operating state of an air conditioner is changed, and that it is the case that a current traveling mode shall be changed.

According to the above aspects, when any one of the conditions that the remaining amount of the battery has changed by more than the predetermined amount, that the operating state of the air conditioner is changed, and that it is the case that the current traveling mode shall be changed is satisfied, it is possible to replan irregularly the traveling mode, that is, without deferring planning of the traveling mode. Therefore, it is possible to facilitate optimization of the battery consumption.

According to a third aspect of the invention, there is provided a driving assist system for assisting driving of a vehicle which includes an internal combustion engine and an electric motor as a driving source based on one traveling mode that is selected from a plurality of different traveling modes, wherein the plurality of different traveling modes are traveling modes that are planned for each section obtained by dividing a traveling route of the vehicle from the current position to the destination. The driving assist system includes a moving assist apparatus configured to plan one traveling mode that is selected from the plurality of traveling modes for each section of the traveling route. The moving assist apparatus includes: a mode planning unit configured to, for each section obtained by dividing the traveling route from the current position to the destination, plan regularly or irregularly one traveling mode from a first mode of not maintaining a charge storage amount of a battery and a second mode of maintaining the charge storage amount of the battery, based on a traveling load associated with the section; and an information generation unit configured to generate periodically traveling load information that is referenced by the mode planning unit, wherein, the mode planning unit is configured to, when replanning the traveling mode based on the traveling load information generated by the information generation unit, defer an execution of the replanning of the traveling mode a period to which from an execution of the previous planning does not reach a predetermined period, in addition to the regular planning.

According to the above configuration, it is possible for a vehicle including a plurality of traveling modes to suppress the discomfort due to the replanning of the traveling mode, and to assist the driving of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

A first embodiment embodying a moving assist apparatus and a moving assist method as well as a driving assist system will be described below with reference to FIGS. 1 to 5. The moving assist apparatus and the moving assist method as well as the driving assist system according to this embodiment are applied to a hybrid vehicle using an electric motor having a battery consisting of a secondary battery as a power source and an internal combustion engine having gasoline and other fuel as a power source as a driving source.

Figure 1:
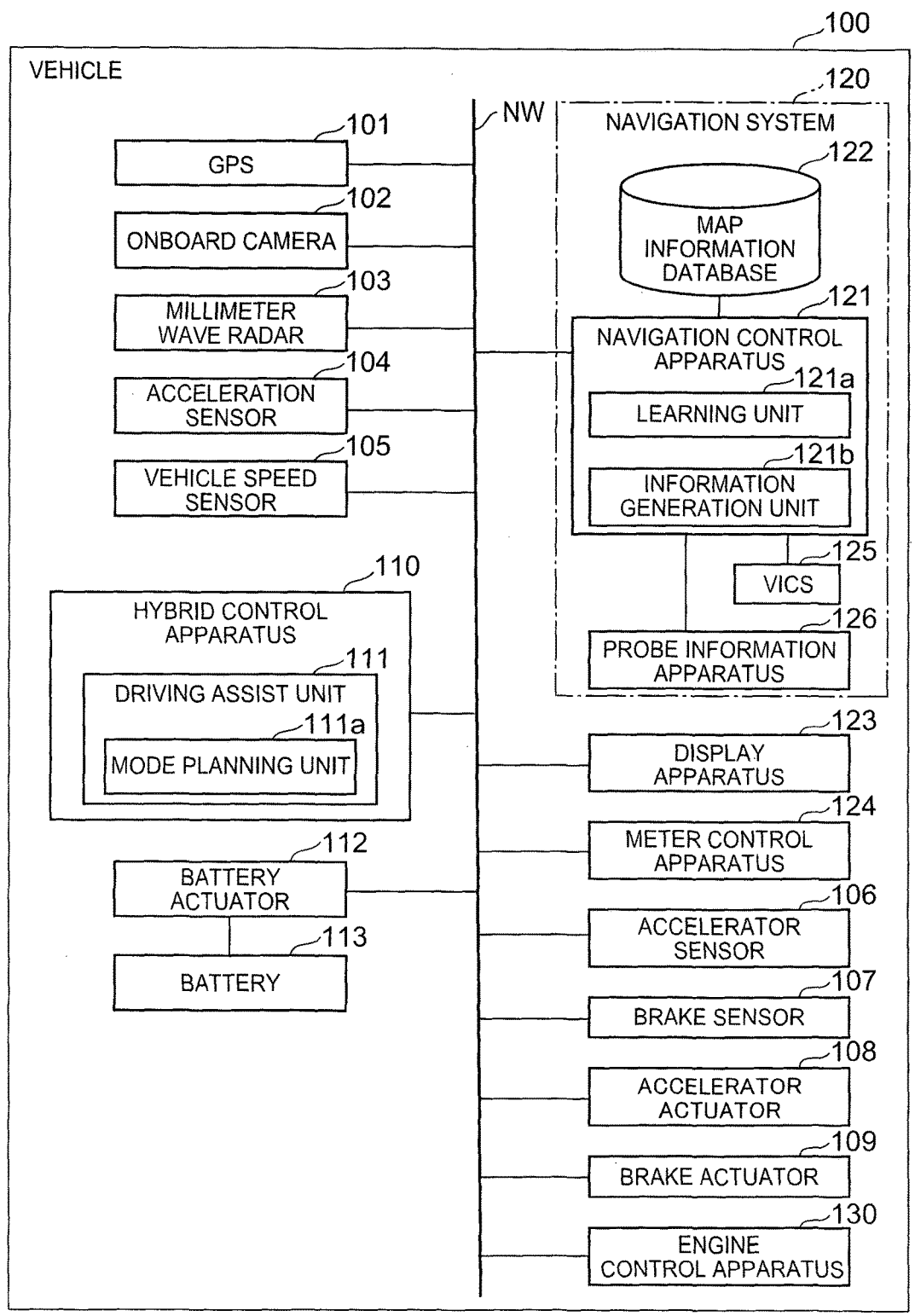
FIG. 1 is a block diagram illustrating a schematic configuration for a first embodiment of a moving assist apparatus.

As shown in FIG. 1, a vehicle 100 is provided with, as an apparatus for detecting a traveling state of the vehicle 100, for example, a GPS (Global Positioning System) 101, an onboard camera 102, a millimeter wave radar 103, an acceleration sensor 104, a vehicle speed sensor 105, and the like. The GPS 101, the onboard camera 102, the millimeter wave radar 103, the acceleration sensor 104 and the vehicle speed sensor 105 are connected to a hybrid control apparatus 110, a navigation control apparatus 121 of a navigation system 120 and an engine control apparatus 130, for example, via an onboard network NW such as a CAN (Controller Area Network). Further, the hybrid control apparatus 110, the navigation control apparatus 121 and the engine control apparatus 130 are a so-called ECU (Electronic Control Unit) configured to include a small computer having a computing apparatus and a storage apparatus. The hybrid control apparatus 110, the navigation control apparatus 121 and the engine control apparatus 130 are able to perform various controls by operating the programs and parameters stored in the storage apparatus by the computing apparatus.

The GPS 101 receives a signal from a GPS satellite, and detects a position of the vehicle 100 such as latitude and longitude on the basis of the signal received from the GPS satellite. Further, the GPS 101 outputs information indicating the detected position (latitude and longitude) of the vehicle 100, that is position information. The onboard camera 102 captures an image of surrounding environment of the vehicle 100 and outputs image data obtained by the imaging. The millimeter-wave radar 103 detects an object that is present around the vehicle 100 by using a radio wave in the millimeter wave band, and outputs a signal corresponding to the detection result.

The acceleration sensor 104 detects an acceleration of the vehicle 100 and outputs a signal corresponding to the detected acceleration. The vehicle speed sensor 105 detects a rotating speed of a wheel of the vehicle 100 and outputs a signal corresponding to the detected rotating speed.

An accelerator sensor 106 detects an operation amount by the driver to an accelerator pedal, and outputs a signal corresponding to the detected operation amount to the accelerator pedal. A brake sensor 107 detects an operation amount by the driver to a brake pedal, and outputs a signal corresponding to the detected operation amount to the brake pedal.

Further, the vehicle 100 is provided with an accelerator actuator 108 for controlling a driving state of the internal combustion engine and a brake actuator 109 for controlling a brake. The accelerator actuator 108 and the brake actuator 109 are electrically connected to the onboard network NW. The accelerator actuator 108 controls the internal combustion engine on the basis of a control amount of the internal combustion engine that is calculated by the engine control apparatus 130 according to a detected value of the accelerator sensor 106. Further, the brake actuator 109 controls the brake on the basis of a control amount of the brake that is calculated by the engine control apparatus 130 according to a detected value of the brake sensor 107.

Further, the vehicle 100 is provide with a battery 113 that is a power source of the electric motor as the driving source, and a battery actuator 112 for controlling charging and discharging of the battery 113. The battery actuator 112 is electrically connected to the onboard network NW. The battery actuator 112 manages the charging and discharging of the battery 113 and the like. Further, the battery actuator 112 drives the electric motor by controlling the discharging of the battery 113, or charges the battery 113 by a regeneration of the electric motor.

The vehicle 100 is provided with the hybrid control apparatus 110 for controlling driving-states of the internal combustion engine and the electric motor. The hybrid control apparatus 110 is electrically connected to the battery actuator 112, the accelerator actuator 108 and the brake actuator 109 via the onboard network NW.

The hybrid control apparatus 110 determines a distribution of a driving force (output ratio) of the internal combustion engine and the electric motor on the basis of the detection results of the acceleration sensor 104, the vehicle speed sensor 105 and the accelerator sensor 106. In particular, the hybrid control apparatus 110 adjusts an energy remaining amount of the battery 113 that is a remaining amount of the battery 113 according to a variation of the distribution of the driving force (output ratio) of the internal combustion engine and the electric motor. The hybrid control apparatus 110 performs an EV traveling of using the electric motor as the driving source and stopping the internal combustion engine and a HV traveling of using the internal combustion engine and the electric motor as the driving source.

The hybrid control apparatus 110 suitably selects a CD (Charge Depleting) mode that is a mode of consuming a charge storage amount of the battery 113 and a CS (Charge Sustaining) mode that is a mode of maintaining the charge storage amount of the battery 113.

The CD mode is a mode of actively consuming electric power obtained by charging in the battery 113 instead of maintaining the charge storage amount of the battery 113, and is a mode of giving priority to the EV traveling. Hereinafter this CD mode will be described as an EV mode. Note that, even in the EV mode, if the accelerator pedal is largely depressed for a large traveling power, the internal combustion engine is driven.

The CS mode is a mode of maintaining the charge storage amount of the battery 113 in a predetermined range with respect to a reference value, and is a mode of giving priority to the HV traveling of driving the internal combustion engine and enabling a regeneration operation of the electric motor as required in order to maintain the charge storage amount. Hereinafter this CS mode will be described as an HV mode. Note that, even in the HV mode, if the charge storage amount of the battery 113 is above the reference value, the internal combustion engine is stopped. The reference value of the HV mode is suitably set as a value of the charge storage amount when it is changed from the EV mode to the HV mode, or a value of the charge storage amount required for maintaining performance of the battery 113.

In the selected EV mode or HV mode, the hybrid control apparatus 110, based on the distribution of the driving force, generates a control command of the battery actuator 112 related to the discharging of the battery 113 or the like and information related to a control amount of the internal combustion engine that is calculated by the engine control apparatus 130. Further, the hybrid control apparatus 110 determines a distribution of a braking force of the brake and the electric motor based on the detection results of the acceleration sensor 104, the vehicle speed sensor 105, and the brake sensor 107. The hybrid control apparatus 110, based on the distribution of the braking force, generates a control command of the battery actuator 112 related to the charging of the battery 113 or the like and information related to a control amount of the brake that is calculated by the engine control apparatus 130. That is, the hybrid control apparatus 110 controls the charging and discharging of the battery 113 by outputting the generated control command to the battery actuator 112. Thus, the electric motor using the battery 113 as the power source (power supply) is driven by the discharging of the battery 113, or the battery 113 is charged by the regeneration of the electric motor. Further, the hybrid control apparatus 110 is capable of monitoring an executing state of the hybrid control and a charging rate of the battery 113.

The hybrid control apparatus 110 switches control between the EV mode and the HV mode according to the selection result of the driver of the vehicle 100. Further, the hybrid control apparatus 110 has a function of switching between the EV mode and HV mode automatically, to perform the control of switching between the EV mode and the HV mode based on information related to a traveling load required for traveling in each section of a traveling route of the vehicle 100 that is input from the navigation control apparatus 121 and the like. Note that, the traveling load is a load per unit distance in the section, and is an average load amount required for traveling in the section. On the other hand, an accumulated value of the traveling load required to finish the section is defined as energy consumption.

Further, the vehicle 100 is provided with a map information database 122 in which map data is registered. The map data is data related to geography such as roads. Data that can indicate an indication type of geography and the like and information related to a position such as latitude and longitude is registered in the map data. The data of indication type includes indication information such as a river, a lake, and the sea. Further, information such as intersection names, road names, district names, direction guide, and facility information may be registered in the map data.

Further, the map information database 122 includes node data that is information related to a node indicating a position on a road, and link data that is information related to a link as a section between two nodes. The node on the road is set as a position of particular traffic element such as an intersection, a traffic light and a curve, a position where the number of lanes is changed and the like. The node data includes position information of the node, road information of this position and the like. The link is set as a section between two nodes and delimited by the two nodes. The link data includes information, of the two nodes, road information of the link section and the like. The traveling load may be obtained or calculated from traveling load information included in the link data. Information such as a start point position, an end point position, a distance, a route, an undulation is included as the road information of the link section. Further, the link data includes various types of data such as cost data including the traveling load of the link section, road data including a road type, mark data indicating a particular position, intersection data indicating intersection information and facility data indicating the facility information.

In detail, the node data is configured of an identification number of the node that is a node ID, coordinates of the node, link IDs of all the links that are connected to the node, a node type indicating a type such as an intersection, a confluence point and the like, for example. Further, the node data may be configured to include data indicating an identification number of an image of the node that is an image ID and the like for indicating characteristics of the node and the like.

Further, the link data is configured of an identification number of the link that is a link ID, a link length, the node ID of each node connected to the start and end points, for example. Further, except for the data indicating the road type such as a highway, a toll road, a general road, an urban/suburban road, a mountainous area road, a tunnel, a bridge, and a three-dimensional crossing road, the link data is configured to include necessary information out of the data indicating a road width, the number of lanes, a link traveling time, a legal speed limit, a road slope and the like. In addition, the link data may be configured to include data indicating an average value, a maximum value, a minimum value or the like of a moving time, a moving speed, fuel consumption, power consumption and the like, as necessary output of the vehicle 100 in each link that is the traveling load information. The power consumption is an amount of electric power consumed by the electric motor when the vehicle 100 travels in the EV mode. The traveling load of the link (section) is obtained or calculated based on such traveling load information. Note that, the traveling load is an average value over the link (section), and its unit is set to [kW] or the like. Further, the energy consumption as an accumulated value of the traveling load required to finish each link (section) may be calculated from the traveling load and the link length (section length).

The vehicle 100 is provided with the navigation system 120 for performing a route guidance and the like. The navigation control apparatus 121 of the navigation system 120 obtains a current position (latitude and longitude) of the vehicle 100 from the GPS 101. Further, the navigation control apparatus 121 determines a destination point (latitude and longitude) if the driver sets the destination point. Then, the navigation control apparatus 121 searches a traveling route from the current position of the vehicle 100 to the destination point by referring to the map information database 122 and using a Dijkstra algorithm, for example.

The navigation control apparatus 121 is provided with a learning unit 121a for learning the moving time, the moving speed, the fuel consumption and the power consumption obtained by the vehicle 100 in the traveling route that has been traveled. The learning unit 121a constitutes a moving assist apparatus which functions by executing a program in the navigation control apparatus 121. The learning unit 121a obtains the moving time, the moving speed, the fuel consumption and the power consumption for each section of the traveling route from various sensors, and stores these pieces of information in each section of the map information database 122 in association with each other. The learning unit 121a performs the storage to each section of the map information database 122 in association with each other every time traveling through the same section, to increase an accuracy of information for each section.

Further, the navigation control apparatus 121 is provided with an information generation unit 121b for generating information such as the traveling load that is referenced when planning the traveling mode. The information generation unit 121b constitutes the moving assist apparatus which functions by executing the program in the navigation control apparatus 121. In particular, the information generation unit 121b has a function of calculating the traveling load of each section of the traveling route based on slope information and traffic congestion information of each section. The information generation unit 121b calculates the traveling load during normal traveling based on vehicle information such as the moving speed, the moving time, the fuel consumption, and the power consumption of the vehicle 100, and information on traveling environment. Moreover, the learning unit 121a performs the storage in each section of the map information database 122 in association with each other.

The navigation control apparatus 121 is connected to a VICS (Vehicle Information and Communication System) (registered trademark) 125 that obtains information such as the traffic congestion information, required time, accident/failure vehicle/construction information, and a speed limit/a lane limit. Further, the navigation control apparatus 121 is connected to a probe information apparatus 126 for obtaining probe traffic information that is road traffic information generated by using information such as an actual traveling position and the vehicle speed obtained from a data center and a the vehicle which shares the information. Therefore, the information generation unit 121b can recognize a section out of respective sections of the traveling route that is in traffic congestion by obtaining the traffic congestion information from one or both of the VICS 125 and the probe information apparatus 126.

The information generation unit 121b may generate the traveling load information when at least one of the following conditions is satisfied. A predetermined time has elapsed from previous generating (outputting) of the traveling load.

The traffic congestion information including a change in traffic condition caused by traffic congestion or the like is obtained. The traveling route has been changed. Then, the navigation control apparatus 121 outputs information indicating the searched traveling route as well as the calculated traveling load, moving time, moving speed, fuel consumption, and power consumption to the hybrid control apparatus 110 via the onboard network NW, and to a display apparatus 123 configured of a liquid crystal display or the like that is provided inside the vehicle via the onboard network NW.

Further, the vehicle 100 is provided with a meter control apparatus 124 for controlling a displaying state of a meter displayed on an instrument panel that is provided on a dashboard. The meter control apparatus 124 obtains for example, data indicating a charging and discharging state of the battery 113 from the hybrid control apparatus 110, and visually displays for example, an energy flow of the vehicle 100 based on the obtained data. The energy flow refers to a flow of energy in the vehicle 100 caused by the charging and discharging of the battery 113, the driving force/regeneration of the electric motor and the like. In addition, the energy flow may include a flow of energy in the vehicle 100 caused by the driving force of the internal combustion engine and the like.

The hybrid control apparatus 110 allocates a traveling mode for each section of the traveling route if the traveling route is input. The hybrid control apparatus 110 is provided with a driving assist unit 111 for assisting the allocation of traveling mode corresponding to the traveling route. The driving assist unit 111 obtains from the navigation control apparatus 121 information on the traveling route to the destination point set by the driver. Further, the driving assist unit 111 is provided with a mode planning unit 111a for planning the traveling mode that is allocated to the section of the obtained traveling route. The mode planning unit 111a constitutes the moving assist apparatus, and functions by executing a program in the hybrid control apparatus 110. The mode planning unit 111a has a function of calculating the energy consumption based on the traveling load information obtained from the navigation control apparatus 121 and the like, and planning the traveling mode for each section depending on the traveling load of each section of the traveling route during the normal traveling by considering an energy balance of the entire traveling route.

The mode planning unit 111a plans the traveling mode when at least one of the following conditions is satisfied. The traveling load information has been updated.

A predetermined time has elapsed from an execution of the previous planning of the traveling mode. The remaining amount of the battery is reduced by a predetermined amount from the execution of the previous planning of the traveling mode. An operating state of an air conditioner is changed.

It is the case that a current traveling mode shall be changed. For example, it is the case that the remaining amount of the battery is going to be zero despite there is a downhill ahead or that the remaining amount of the battery will be fully charged. In general, there is a trend that the efficiency is better by traveling through the section of a small traveling load with the electric motor, and that the efficiency is better by traveling through the section of a large traveling load with the internal combustion engine. Therefore, the hybrid control apparatus 110 allocates the EV mode to the section of a small traveling load and the HV mode to the section of a large traveling load.

The mode plan unit 111a compares the traveling loads in a plurality of target sections to allocate the EV mode sequentially from the section of a small traveling load. Further, the mode planning unit 111a accumulates the energy consumption of the section to which the EV mode is allocated, and subtracts it from an energy remaining amount of the battery 113. Then, the mode planning unit 111a continues to allocate the EV mode to each section such that the accumulated energy consumption does not exceed the energy remaining amount of the battery 113. Thus, the mode planning unit 111a allocates the EV mode to the section of a relatively small traveling load out of the sections of the traveling route. Further, the mode planning unit 111a allocates the HV mode to the section to which the EV mode is not allocated.

However, if the information generation by the information generation unit 121b and the traveling mode replanning by the mode planning unit 111a are performed in different periods when different conditions are satisfied, an interval between the information generation by the information generation unit 121b and the traveling mode replanning by the mode planning unit 111a sometimes may become shorter. For example, in the case of replanning the traveling mode by the mode planning unit 111a following the information generation unit 121b generating the information, such a trend is particularly significant. Therefore, the mode planning unit 111a does not perform the replanning until predetermined time from the execution of previous planning has elapsed, in particular, defers the execution. That is, in this embodiment, the information generation unit 121b, on condition that the predetermined time from the mode planning unit 111a planning the traveling mode has elapsed, outputs the traveling load information and the like to the mode planning unit 111a. The mode planning unit 111a allows outputting when the predetermined time from the planning of the traveling mode has elapsed, and prohibits outputting when the predetermined time from the planning of the traveling mode has not elapsed. In this way, since the planning by the mode planning unit 111a is performed by the predetermined time from the execution of the previous planning, the traveling mode will not be changed in a short time, and the discomfort due to the replanning of the traveling mode can be suppressed.

The mode planning unit 111a also outputs the traveling mode that is planned for each section of the traveling route as described above to the display apparatus 123, and displays the planned traveling mode for the section being traveled on the display device 123.

The hybrid control apparatus 110 determines the section being currently traveled that is a current section by suitably obtaining information on the position being traveled, and causes the vehicle 100 to travel in the determined section with the planned traveling mode. That is, every time the traveling route of the vehicle 100 is changed, the hybrid control apparatus 110 switches the traveling mode of the vehicle 100 to the EV mode or the HV mode that is allocated to the section. Thus, the vehicle 100 travels in the section being currently traveled (current section) with the planned traveling mode.

Next, with reference to FIG. 2, an traveling load information generation process that is performed by the information generation unit 121b of the navigation control apparatus 121 and the effect thereof will be described. The information generation unit 121b, when the traffic congestion information is updated, or every time a predetermined time α has elapsed, generates the traveling load information for each section of the traveling route.

Figure 2:
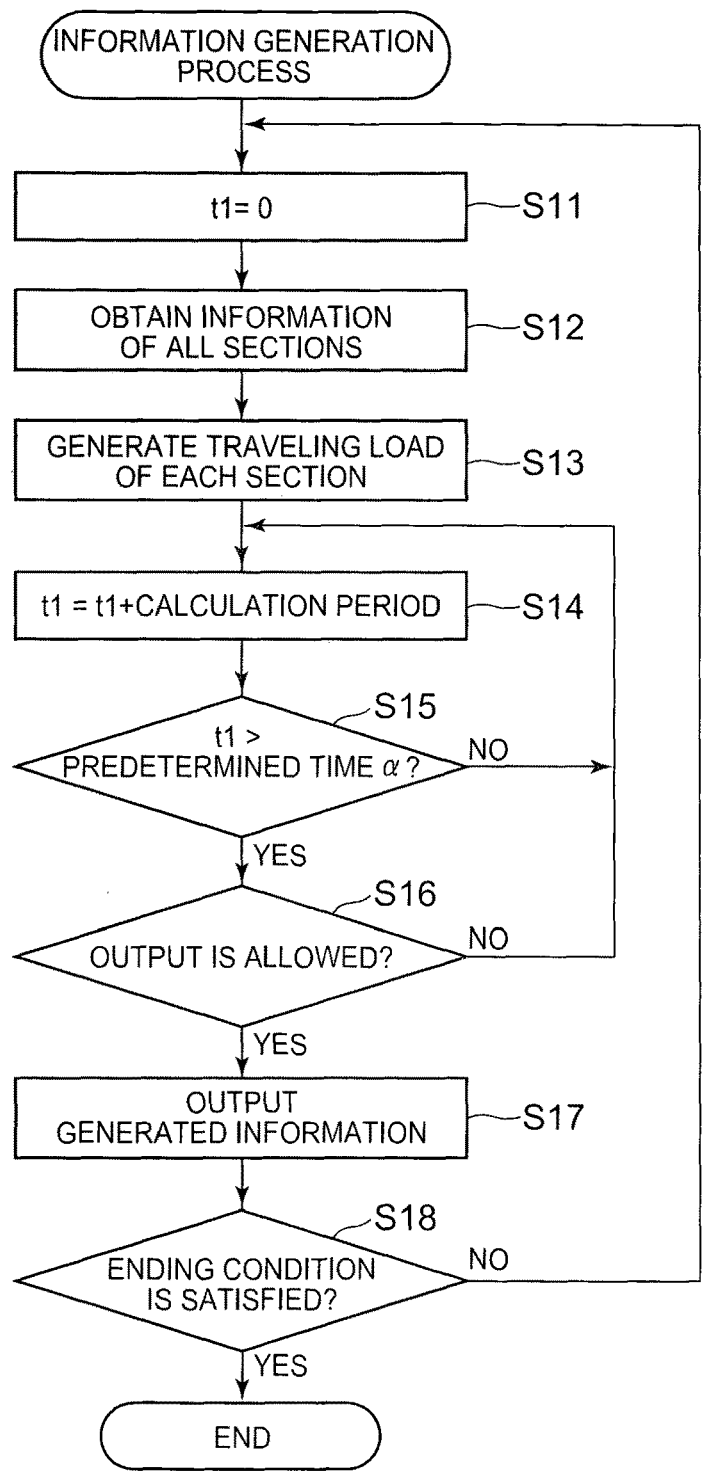
FIG. 2 is a flowchart illustrating processing steps for an information generation process performed by the moving assist apparatus of the embodiment.

As shown in FIG. 2, if the destination point is set, the navigation control apparatus 121 sets processing time t1 of information generation as "t1=0" (Step S11), and obtains route information for all sections of the traveling route (Step S12). That is, the information generation unit 121b obtains the slope, the moving time, the moving speed, the fuel consumption, and the power consumption of each section of the traveling route from the map information database 122, and obtains information of the section in which the traffic congestion occurs by using the VICS 125 and the probe information apparatus 126. Then the information generation unit 121b generates the traveling load of each section based on the information obtained from the map information database 122, the VICS 125, and the probe information apparatus 126 (Step S13).

If the traveling load of each section is generated, the navigation control apparatus 121 sets the processing time t1 as "t1=t1+calculation period" (Step S14). That is, the information generation unit 121b adds the time t1 that has elapsed from starting the information generation to the time (period) required for the next calculation. Then the navigation control apparatus 121 determines whether the processing time t1 is larger than the predetermined time α (Step S15). As a result, if the information generation unit 121b determines that the processing time t1 is below the predetermined time α (Step S15: NO), the process proceeds to step S14.

On the other hand, if it is determined that the processing time t1 is larger than the predetermined time α (Step S15: NO), the navigation control apparatus 121 determines whether the generated information is allowed to be output (Step S16). As a result, if the navigation control apparatus 121 determines that the generated information is not allowed to be output, that is, the generated information is prohibited to be output (Step S16: NO), the process proceeds to step S14.

On the other hand, if it is determined that the generated information is allowed to be output (Step S16: YES), the navigation control apparatus 121 outputs the generated information (Step S17). That is, since the information generation unit 121b can output the information that is generated after a predetermined time (β) has elapsed in the mode planning unit 111a, the generated information is output to the information generation unit 121b.

Then the navigation control apparatus 121 determines whether an ending condition is satisfied (Step S18). That is, the information generation unit 121b takes a condition that the remaining amount of the battery 113 is remained slightly as the ending condition. If the navigation control apparatus 121 determines that the ending condition that the remaining amount of the battery 113 is remained slightly is not satisfied (Step S18: NO), the process proceeds to step S11.

On the other hand, if it is determined that the ending condition that the remaining amount of the battery 113 is remained slightly is satisfied (Step S18: YES), the navigation control apparatus 121 ends the information generation process as traveling in the EV mode can not be performed and there is no need for mode planning.

Next, with reference to FIGS. 3 and 4, a planning process of the traveling mode in parallel with the information generation process of FIG. 2 that is performed by the mode planning unit 111a of the driving assist unit 111 and the effect thereof will be described. The mode planning unit 111a replans of the traveling mode for each section of the traveling route every time the predetermined time β has elapsed. If the traveling load information that is generated by the information generation unit 121b is obtained, the mode planning unit 111a urges the replanning of the traveling mode. The predetermined time β corresponds to the predetermined period.

Figure 3:
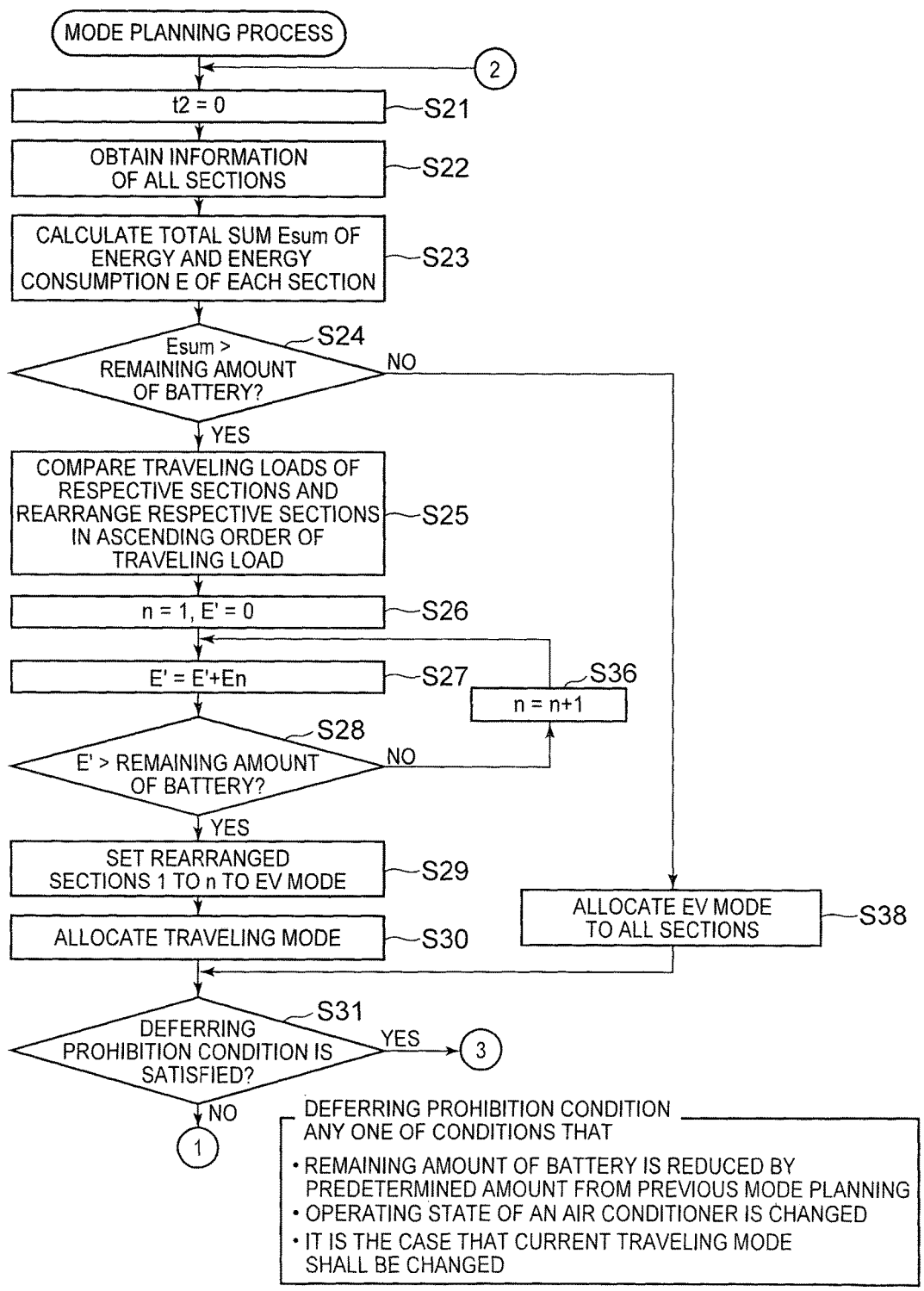
FIG. 3 is a flowchart illustrating processing steps for a traveling mode planning process performed by the moving assist apparatus of the embodiment.
Figure 4:
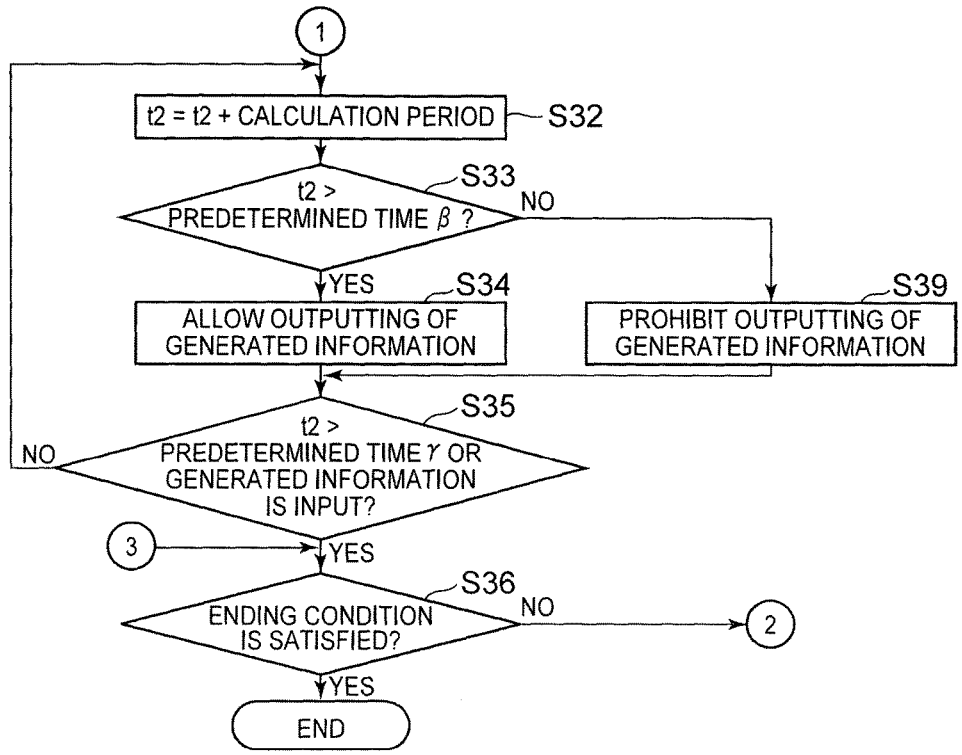
FIG. 4 is a flowchart illustrating the processing steps for the traveling mode planning process performed by the moving assist apparatus of the embodiment.

As shown in FIGS. 3 and 4, if the destination point is set by the navigation control apparatus 121, the driving assist unit 111 sets processing time t2 of mode planning as "t2=0" (Step S21), and obtains route information for all sections of the traveling route (Step S22). That is, the mode planning unit 111a obtains information including the traveling load of each section of the traveling route that is generated by the information generation unit 121b of the navigation control apparatus 121.

The driving assist unit 111 calculates energy consumption E of each section of the traveling route and a sum of energy consumption Esum of all sections of the traveling route (Step S23). The driving assist unit 111 determines the sum of energy consumption Esum of all sections of the traveling route is larger than the remaining amount of the battery 113 (Step S24). That is, the mode planning unit 111a determines whether it is possible to travel in all sections of the traveling route with the EV mode. As a result, if it is determined that the sum of energy consumption Esum of all sections of the traveling route is below the remaining amount of the battery 113 (Step S24: NO), the driving assist unit 111 allocates the EV mode to all sections of the traveling route (Step S38).

On the other hand, if it is determined that the sum of energy consumption Esum of all sections of the traveling route is larger than the remaining amount of the battery 113 (Step S24: YES), the driving assist unit 111 compares the traveling loads of respective sections of the traveling route, and rearranges the respective sections in an ascending order of traveling load (Step S25).

The driving assist unit 111 sets the section that is rearranged in the ascending order of traveling load as a section n=1 to n, the section n=1, and the energy consumption E'=0 (Step S26). The driving assist unit 111 calculates the sum of energy consumption up to the section n (E'=E'+E'n) (Step S27).

Next, the driving assist unit 111 determines whether the sum of energy consumption E' of the sections up to the section n is larger than the remaining amount of the battery 113 (Step S28). If it is determined that the sum of energy consumption E' of the sections up to the section n is below the remaining amount of the battery 113 (Step S28: NO), the driving assist unit 111 sets n=n+1 for adding a single section (Step S36).

On the other hand, if it is determined that the sum of energy consumption E' of the sections up to the section n is greater than the remaining amount of the battery 113 (Step S28: YES), the driving assist unit 111 sets the rearranged sections 1 to n to the EV mode (Step S29). Then the driving assist unit 111 allocates the traveling mode to each section of the traveling route (Step S30).

Next, the driving assist unit 111 determines whether a deferring prohibition condition is satisfied (Step S31). That is, the mode planning unit 111a determines whether any one of the following deferring prohibition conditions is satisfied.

The remaining amount of the battery 113 is reduced by a predetermined amount from the previous mode planning. The operating state of the air conditioner is changed. It is the case that the current traveling mode shall be changed.

As a result, if the mode planning unit 111a determines that the deferring prohibition condition is satisfied (Step S31), a deferring process for deferring the planning of the traveling mode during the predetermined time β (Steps S32 to S35) is not performed, and the process proceeds to step S36. On the other hand, if the mode planning unit 111a determines that the deferring prohibition condition is not satisfied (Step S31), the process proceeds to step S32 to perform the deferring process.

Next, the driving assist unit 111 sets the processing time t2 as "t2=t2+calculation period" (Step S32). That is, the mode planning unit 111a adds the time t2 that has elapsed from starting the mode planning to the time (period) required for the next calculation.

Then the driving assist unit 111 determines whether the processing time t2 is larger than the predetermined time β (Step S33). That is, the mode planning unit 111a determines whether the processing time t2 is larger than the predetermined time β that is the minimum interval of replanning. As a result, if it is determined that the processing time t2 is below the predetermined time β (Step S32: NO), the mode planning unit 111a prohibits outputting the generated information (Step S39). That is, since the predetermined time β has not elapsed from the execution of the previous planning of the traveling mode, in order to prevent the planning of the traveling mode from changing frequently, the mode planning unit 111a instructs to prohibit outputting the generated information from the navigation control apparatus 121 to the hybrid control apparatus 110. Thus, even the information generation unit 121b generates the traveling load information, the outputting of the generated information is stopped during the predetermined time β.

On the other hand, if it is determined that the processing time t2 is larger than the predetermined time β (Step S32: YES), the mode planning unit 111a allows outputting the generated information (Step S34). That is, since the predetermined time β has elapsed from the execution of the previous planning of the traveling mode, the mode planning unit 111a instructs to allow outputting the generated information from the navigation control apparatus 121 to the hybrid control apparatus 110.

Then the driving assist unit 111 determines whether the processing time t2 is larger than the predetermined time γ (γ>β) or whether the generated information is input (Step S35). That is, the mode planning unit 111a determines whether the generated information can be output according to the predetermined time β that is the minimum interval of the replanning, and determines whether the traveling mode can be replanned according to the predetermined time γ that is the maximum interval of the replanning. Further, since the traveling load information used for replanning the traveling mode is updated in the case that the generated information is input, the mode planning unit 111a makes the process to proceed in order to replan the traveling mode. As a result, if the mode planning unit 111a determines that the processing time t2 is below the predetermined time γ (γ>β) and no generated information is input (Step S35: NO), the process proceeds to step S31. In other words, the mode planning unit 111a waits for the processing time t2 until the predetermined time γ (γ>β) has elapsed or the generated information is input.

On the other hand, if it is determined that the processing time t2 is larger than the predetermined time γ (γ>β) or the generated information is input (Step S35: YES), in order to replan, the mode planning unit 111a determines whether the ending condition is satisfied (Step S36). In other words, the mode planning unit 111a takes a condition that the remaining amount of the battery 113 is remained slightly as the ending condition. If the driving assist unit 111 determines that the ending condition that the remaining amount of the battery 113 is remained is not satisfied (Step S36: NO), the process proceeds to step S21.

On the other hand, if it is determined that the ending condition that the remaining amount of the battery 113 is remained slightly is satisfied (Step S36: YES), the navigation control apparatus 121 ends the mode planning process as traveling in the EV mode can not be performed and there is no need for mode planning.

Figure 5:
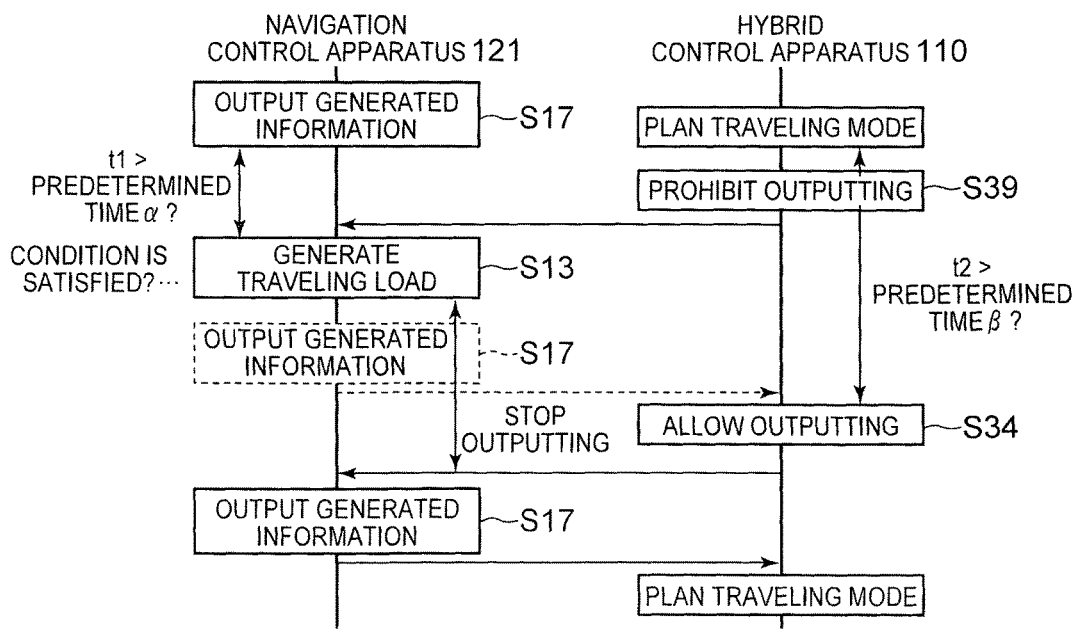
FIG. 5 is a sequence chart illustrating a timing relationship between the information generation process and the traveling mode planning process of the moving assist apparatus of the embodiment.

In following, with reference to FIG. 5, a timing relationship between the information generation process and the mode planning process will be described. As shown in FIG. 5, for example, a case where the information generation unit 121b of the navigation control apparatus 121 generates the traveling load information before the predetermined time has elapsed for the processing time t2 from the planning of the traveling mode by the mode planning unit 111a of the hybrid control apparatus 110 is described.

If the processing time t1 is larger than the predetermined time α from outputting of the generated information (Step S17), the navigation control apparatus 121 generates the traveling load information (Step S13). On the other hand, if the traveling mode has been planned for the traveling route, the hybrid control apparatus 110 prohibits outputting the generated information (Step S39). At this time, if there is no deferring process in the hybrid control apparatus 110, as indicated by the broken line, when the traveling load is generated (Step S13), the navigation control apparatus 121 outputs the generated information immediately (Step S17), and the hybrid control apparatus 110 plans the traveling mode in a short time from the execution of the previous planning of the traveling mode.

In this embodiment, since the navigation control apparatus 121 prohibits outputting the generated information, outputting of the generated information is stopped during the period in which outputting of the generated information is prohibited. If the processing time t2 is larger than the predetermined time β from the planning of the traveling mode, the hybrid control apparatus 110 allows outputting the generated information for the navigation control apparatus 121 (Step S34).

If allowance of outputting the generated information is input from the hybrid control apparatus 110, the navigation control apparatus 121 outputs the generated information to the hybrid control apparatus 110 (Step S17). If the generated information is input, the hybrid control apparatus 110 plans the traveling mode.

Thus, even the predetermined time α has elapsed from outputting of the generated information and the traveling load information is generated, the navigation control apparatus 121 stops outputting the generated information until the predetermined time β has elapsed from the execution of planning of the traveling mode, that is, until outputting of the generated information is allowed. Therefore, since the interval of replanning the traveling mode is above the predetermined time β, the traveling mode will not be changed in a short time. Therefore, it is possible to suppress the discomfort due to the replanning of the traveling mode.

As described above, according to this embodiment, it is possible to achieve the following effects. (1) The execution of replanning of the traveling mode the time to which from the execution of the previous planning does not reach the predetermined time β is deferred. That is, the replanning of the traveling mode is not executed until the predetermined time β from the execution of the previous planning has elapsed. Therefore, the traveling mode will not be changed in a short period, and the discomfort due to the replanning of the traveling mode can be suppressed.

(2) Even the information generation unit 121b generates the traveling load information, if the time from the execution of the previous planning by the mode planning unit 111*a* does not reach the predetermined time β, the outputting of the generated traveling load information is prohibited. In other words, during the predetermined time β from the execution of the previous planning, the traveling load information is not output from the information generation unit 121*b* to the mode planning unit 111*a*, and the replanning of the traveling mode caused by receipt of the traveling load information can be reliably deferred.

Second Embodiment

A second embodiment embodying a moving assist apparatus and a moving assist method as well as a driving assist system will be described below with reference to FIGS. 6 to 8. The present embodiment is different from the above first embodiment in that the generating itself of the traveling load information is prohibited until a predetermined period has elapsed from the execution of planning of the traveling mode. In following, the difference from the first embodiment will be mainly described.

Herein, the mode planning unit 111*a* also does not replan until a predetermined time has elapsed from the execution of the previous planning, in details, the execution is deferred. That is, in this embodiment, the information generation unit 121*b*, on condition that the predetermined time has elapsed from the planning of the traveling mode by the mode planning unit 111*a*, generates information such as the traveling load. The mode planning unit 111*a* allows generating if the predetermined time has elapsed from the planning of the traveling mode, and prohibits generating if the predetermined time has not elapsed from the planning of the traveling mode. In this way, since the planning by the mode planning unit 111*a* is performed by the predetermined time from the execution of the previous planning, the traveling mode will not be changed in a short time, and the discomfort due to the replanning of the traveling mode can be suppressed.

Figure 6:
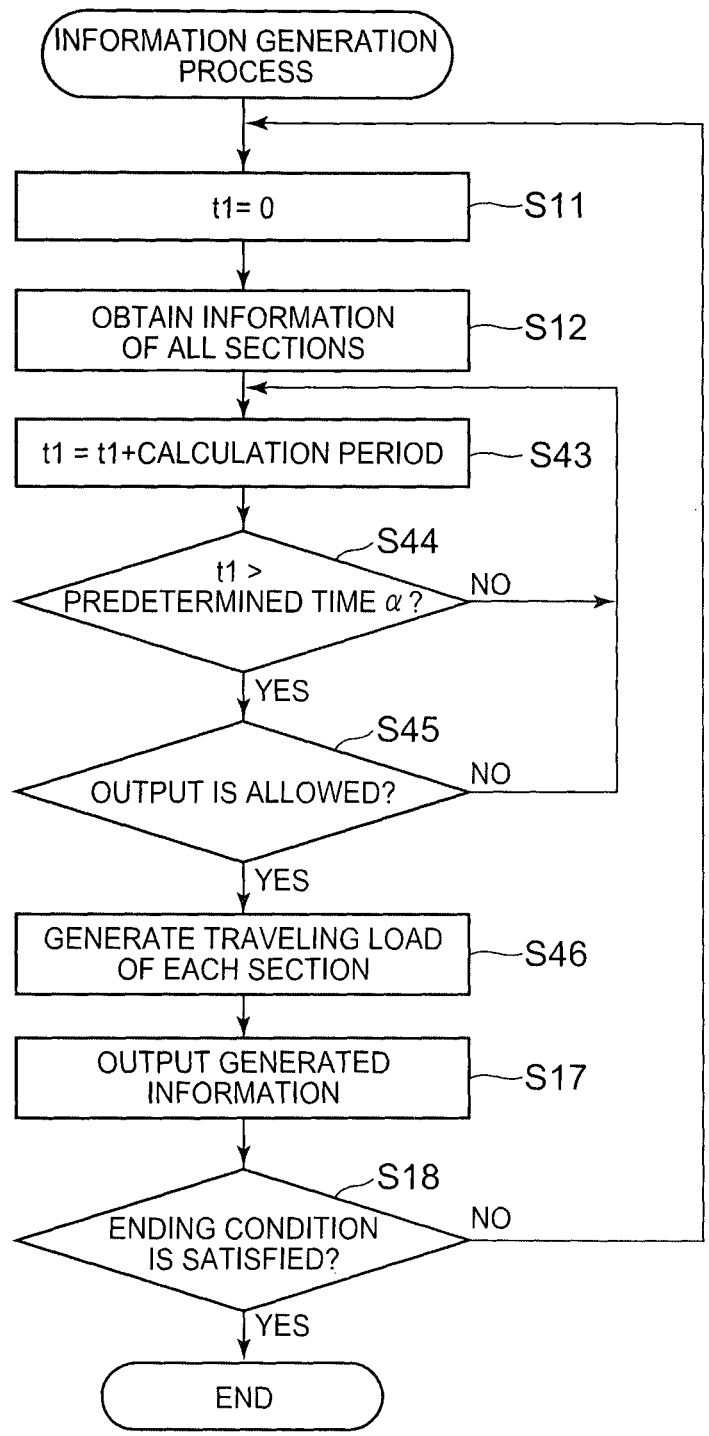
FIG. 6 is a flowchart illustrating processing steps for an information generation process according to a second embodiment of a moving assist apparatus.

With reference to FIG. 6, an traveling load information generation process of the information generation unit 121*b* of the navigation control apparatus 121 and the effect thereof will be described. As shown in FIG. 6, after steps S11 and S12 are performed as in the first embodiment, the navigation control apparatus 121 sets the processing time t1 as "t1=t1+ calculation period" (Step S43). Then the navigation control apparatus 121 determines whether the processing time t1 is larger than the predetermined time α (Step S44). As a result, if the information generation unit 121*b* determines that the processing time t1 is below the predetermined time α (Step S44: NO), the process proceeds to step S43.

On the other hand, if it is determined that the processing time t1 is larger than the predetermined time α (Step S44: NO), the navigation control apparatus 121 determines whether the traveling load information is allowed to be generated (Step S45). As a result, if the navigation control apparatus 121 determines that the traveling load information is not allowed to be generated, that is, the traveling load information is prohibited to be generated (Step S45: NO), the process proceeds to step S43.

On the other hand, if it is determined that the traveling load information is allowed to be generated (Step S45: YES), the navigation control apparatus 121 generates the traveling load of each section based on the information obtained from the map information database 122, the VICS 125, and the probe information apparatus 126 (Step S46). Then the navigation control apparatus 121 outputs the generated information (Step S17). That is, since the information generation unit 121*b* can output the information that is generated after a predetermined time (β) has elapsed in the mode planning unit 111*a*, the generated information is output to the information generation unit 121*b*.

Then the navigation control apparatus 121 ends the information generation process by performing step 18 as in the first embodiment. Next, with reference to FIG. 7, a planning process of the traveling mode in parallel with the information generation process of FIG. 6 that is performed by the mode planning unit 111*a* of the driving assist unit 111 and the effect thereof will be described. The mode planning unit 111*a* replans the traveling mode for each section of the traveling route every time the predetermined time β has elapsed. If the traveling load information that is generated by the information generation unit 121*b* is obtained, the mode planning unit 111*a* urges the replanning of the traveling mode. The predetermined time β corresponds to the predetermined period.

Figure 7:
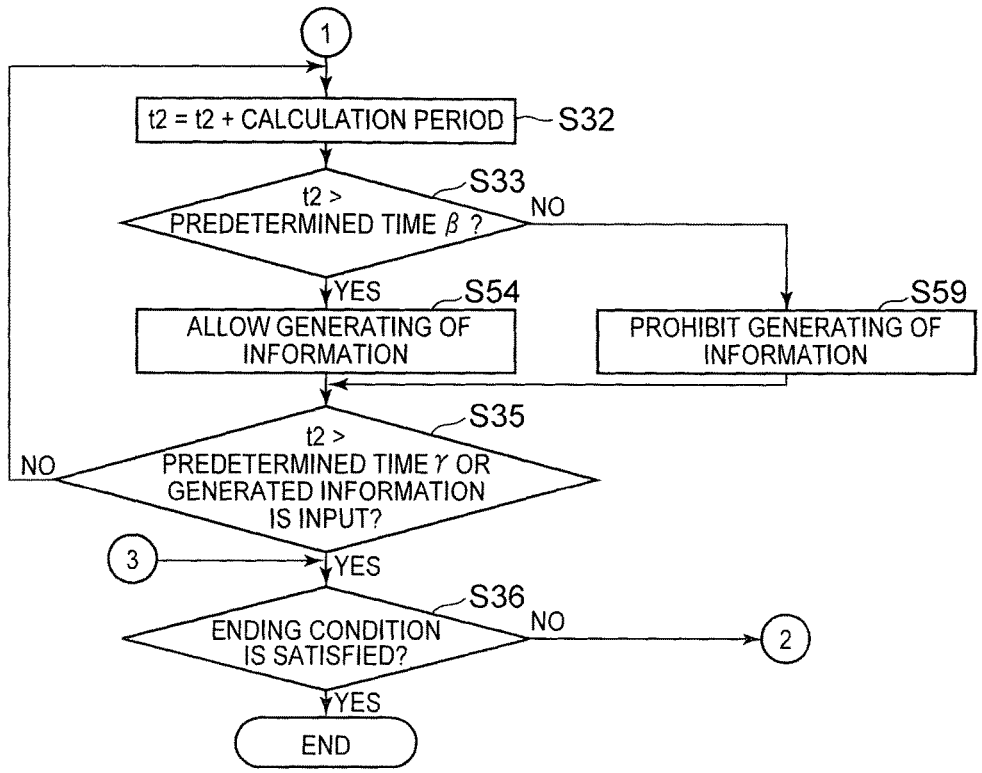
FIG. 7 is a flowchart illustrating processing steps for a traveling mode planning process that is to replace the process in FIG. 4 preformed by the moving assist apparatus of the embodiment.

As shown in FIG. 7 that is a figure to replace the above FIG. 4, after steps S21 to S32 are performed as in the first embodiment, the driving assist unit 111 determines whether the processing time t2 is larger than the predetermined time β (Step S33). As a result, if it is determined that the processing time t2 is below the predetermined time β (Step S33: NO), the mode planning unit 111*a* prohibits generating the traveling load information (Step S59). That is, since the predetermined time β has not elapsed from the execution of the previous planning of the traveling mode, in order to prevent the planning of the traveling mode from changing frequently, the mode planning unit 111*a* instructs to prohibit generating the traveling load information in the navigation control apparatus 121. Thus, the information generation unit 121*b* stops generating the traveling load information at least during the predetermined time β.

On the other hand, if it is determined that the processing time t2 is larger than the predetermined time β (Step S33: YES), the mode planning unit 111*a* allows generating the traveling load information (Step S54). That is, since the predetermined time β has elapsed from the execution of the previous planning of the traveling mode, the mode planning unit 111*a* instructs to allow generating the traveling load information in the navigation control apparatus 121.

Then the driving assist unit 111 performs the steps after step S34 as in the first embodiment, and ends the mode planning process. Next, with reference to FIG. 8, a timing relationship between the information generation process and the mode planning process will be described.

Figure 8:
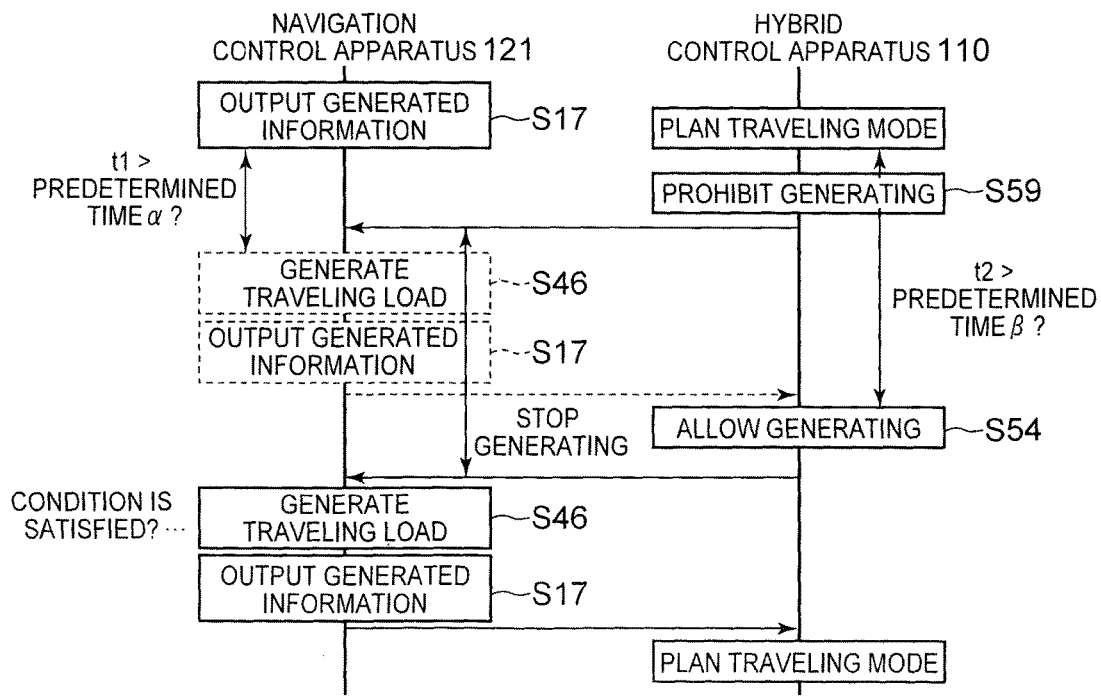
FIG. 8 is a sequence chart illustrating a timing relationship between the information generation process and the traveling mode planning process of the moving assist apparatus of the embodiment.

As shown in FIG. 8, for example, a case where the information generation unit 121*b* of the navigation control apparatus 121 generates the traveling load information after the predetermined time β has elapsed for the processing time t2 from the planning of the traveling mode by the mode planning unit 111*a* of the hybrid control apparatus 110 is described.

If the traveling mode has been planned for the traveling route, the hybrid control apparatus 110 prohibits generating the traveling load information (Step S59). At this time, if there is no deferring process in the hybrid control apparatus 110, as indicated by the broken line, the navigation control apparatus 121 generates the traveling load information (Step S46), and outputs the generated information (Step S17), and the hybrid control apparatus 110 plans the traveling mode in a short time from the execution of the previous planning of the traveling mode.

In this embodiment, since the navigation control apparatus 121 prohibits generating the traveling load information, generating of the traveling load information is stopped during the period in which the generating of the traveling load information is prohibited. If the processing time t2 is larger than the predetermined time β from the planning of the traveling mode, the hybrid control apparatus 110 allows generating the traveling load information for the navigation control apparatus 121 (Step S54).

On the other hand, if allowance of outputting is input from the hybrid control apparatus 110, and the processing time t1 is larger than the predetermined time α from the outputting of the generated information (Step S17), the navigation control apparatus 121 generates the traveling load information (Step S46). Then, if the traveling load information is generated, the navigation control apparatus 121 outputs the generated information to the hybrid control apparatus 110 (step S17). If the generated information is input for the navigation control apparatus 121, the hybrid control apparatus 110 plans the traveling mode.

Thus, if the generating of the traveling load information is allowed, and the predetermined time α has elapsed from the outputting of the generated information, the navigation control apparatus 121 generates the traveling load information. Therefore, since the interval of replanning the traveling mode is above the predetermined time β, the traveling mode will not be changed in a short time. Therefore, it is possible to suppress the discomfort due to the replanning of the traveling mode.

As described above, according to this embodiment, in addition to the effects of the first embodiment (1), it is possible to achieve the following effects. (3) If the time from the execution of the previous planning by the mode planning unit does not reach the predetermined time β, the generating itself of the traveling load information in the information generation unit 121b is prohibited. In other words, during the predetermined period β from the execution of the previous planning, no information is generated, and in this case the replanning of the traveling mode caused by receipt of the traveling load information can be reliably deferred.

Other Embodiments

Further, each of the above embodiments may be implemented in the following forms that are suitably modified. In the above embodiments, when the traveling route is changed, the navigation control apparatus 121 generates and outputs the traveling load information regardless of the predetermined time α and the allowance of outputting or generating. That is, in the information generation process shown in FIG. 2 in the first embodiment, steps S14 to S16 will be omitted. Further, in the information generation process of FIG. 6 in the second embodiment, steps S43 to S45 will be omitted. Thus, when the traveling route is changed, the navigation control apparatus 121 (information generation unit 121b) does not determine whether the predetermined time α has elapsed for the processing time t1 in the information generation process, and generates the traveling load information and outputs the generated information to the hybrid control apparatus 110 (mode planning unit 111a). Therefore, it is possible to execute the planning of the traveling mode in a new traveling route quickly.

In the above embodiments, determining of whether a deferring prohibition condition is satisfied is performed by setting the deferring prohibition condition (Step S31 in FIG. 3), however, the determining of whether the deferring prohibition condition is satisfied may be omitted. In this manner, the traveling mode may be planned reliably after the predetermined time β has elapsed, thus the traveling mode will not be changed in a short period, and the discomfort due to the replanning of the traveling mode can be suppressed.

In the above embodiments, the predetermined time β is set as the predetermined period, however, a predetermined distance may also be set as the predetermined period. In this way, when the distance traveled with a low speed within a period of time is short, it is possible to prevent the traveling mode from being replanned in a short distance and to suppress the discomfort due to the re-planning of the traveling mode to the driver. In addition, the predetermined time and the predetermined distance may be selected as the predetermined period depending on the traveling speed.

In the above embodiments, the mode planning unit 111a defers the execution until the predetermined time has elapsed from the execution of the previous planning to offset the timings, so that the time from generating of the information by the information generation unit 121b is above the predetermined period. However, since the timings can be offset only by making the interval between the planning of the traveling mode by the mode planning unit 111a and the generating of the information by the information generation unit 121b to be above the predetermined period, any one of the planning of the traveling mode by the mode planning unit 111a and the generating of the information by the information generation unit 121b may be advanced.

In the above embodiments, the case where the onboard network NW is a CAN is illustrated. However, the invention is not limited to this, and the onboard network NW may also be configured of other network such as Ethernet (registered trademark), FlexRay (registered trademark) and IEEE1394 (FireWire (registered trademark)), as long as it is communicatively connected to the ECU or the like. Further, it may also be configured of a combination of these networks including the CAN. Thus, for the vehicle using the moving assist apparatus, it is possible to improve design flexibility of the configuration.

In the above embodiments, the GPS 101 is connected to the navigation control apparatus 121 via the onboard network NW. However, the GPS 101 may also be connected directly to the navigation control apparatus 121. In the above embodiments, the case where the navigation system 120 and the driving assist unit 111 are separately configured is illustrated. However, the invention is not limited to this, and the navigation system and the driving assist unit may be provided in the same apparatus. Thus, it is possible to improve design flexibility of the configuration of the moving assist apparatus.

In the above embodiments, the case where the hybrid control apparatus 110 and the driving assist unit 111 are provided in the same apparatus is illustrated. However, the invention is not limited to this, and the hybrid control apparatus and the driving assist unit may be provided in separate apparatuses. Thus, it is possible to improve design flexibility of the configuration of the moving assist apparatus.

In the above embodiments, the case where respective apparatuses such as the navigation system 120 and the display apparatus 123 are provided integrally on the vehicle 100 is illustrated. However, the invention is not limited to this. The respective apparatuses such as the navigation system and the display apparatus may be communicatively connected to each device, and a portable information processing apparatus such as a mobile phone and a smart phone may be used as all or part of these functions. Thus, it is possible to expand design flexibility of the configuration of the moving assist apparatus.

In the above embodiments, the case where the driving assist unit 111, the navigation system 120, the map information database 122 and the like are provide on the vehicle 100 is illustrated. However, the invention is not limited to this, and some functions of the driving assist unit, the navigation system, the map information database and the like may be provided on an information processing apparatus outside the vehicle or a portable information processing apparatus. An information processing center may be cited as an example of the information processing apparatus outside the vehicle, and the mobile phone, the smart phone or the like may be cited as an example of the portable information processing apparatus. The information processing apparatus outside the vehicle may exchange information over a wireless communication line and the like. The portable information processing apparatus may be connected to the onboard network or be connected through short-range communication, and exchange information via a wireless communication line. Thus, it is possible to expand design flexibility of the configuration of the moving assist apparatus.

In the above embodiments, the learning unit 121*a* is provided for learning the moving time, the moving speed, the fuel consumption, and the power consumption obtained from the vehicle 100 in the traveling route that has been traveled. However, it is possible to omit the learning function of learning in the traveling route that has been traveled. Thus, it is possible to reduce the processing required for the learning.

In the above embodiments, the case where the traveling mode is allocated by the driving assist unit 111 is illustrated. However, the invention is not limited to this, and the traveling mode may be allocated by the navigation control apparatus or the like. Thus, it is possible to expand design flexibility of the configuration of the moving assist apparatus.

In the above embodiment, the case where the traveling mode is mainly allocated when the position of the vehicle 100 is the current position is illustrated, but the traveling mode may be allocated at any position during the vehicle moves to the destination point. Moreover, it is possible to perform a suitable allocation of traveling mode to all sections of the traveling route at any position. Thus, it is possible to expand design flexibility of the configuration of the moving assist apparatus.

What is claimed is:

1. A moving assist apparatus for assisting a vehicle which includes an internal combustion engine and an electric motor as a driving source to move from a current position to a destination, the moving assist apparatus comprising:
    processing circuitry configured to:
        for each section obtained by dividing a traveling route from the current position to the destination, choose one traveling mode of the vehicle with the internal combustion engine and the electric motor from a first mode of not maintaining a charge storage amount of a battery of the vehicle and a second mode of maintaining the charge storage amount of the battery to plan at regular intervals or irregular intervals, based on a traveling load associated with the section; and
        generate periodically traveling load information that is referenced; and
        when replanning the traveling mode of the vehicle with the internal combustion engine and the electric motor based on the traveling load information generated, defer an execution of the replanning of the traveling mode when a time between a previous planning of the traveling mode and the replanning of the traveling mode is less than a predetermined period, and execute planning the traveling mode at the regular intervals.

2. The moving assist apparatus according to claim 1, wherein
    the processing circuitry is configured to defer the replanning of the traveling mode when the time between the previous planning of the traveling mode and the replanning of the traveling mode is less than the predetermined period, by prohibiting outputting the traveling load information generated that urges the replanning of the traveling mode.

3. The moving assist apparatus according to claim 1, wherein
    the processing circuitry is configured to defer the replanning of the traveling mode when the time between the previous planning of the traveling mode and the replanning of the traveling mode is less than the predetermined period, by prohibiting generating the traveling load information that urges the replanning of the traveling mode.

4. The moving assist apparatus according to claim 1, wherein
    a condition that the processing circuitry replans the traveling mode at the irregular intervals includes any one of conditions that a remaining amount of the battery has changed by more than a predetermined amount, that an operating state of an air conditioner is changed, and that it is a case that a current traveling mode shall be changed.

5. A moving assist method for assisting a vehicle which includes an internal combustion engine and an electric motor as a driving source when the vehicle moves from a current position to a destination, the moving assist method comprising:
    for each section obtained by dividing a traveling route from the current position to the destination, choosing, by processing circuitry, one traveling mode of the vehicle with the internal combustion engine and the electric motor from a first mode of not maintaining a charge storage amount of a battery of the vehicle and a second mode of maintaining the charge storage amount of the battery to plan at regular intervals or irregular intervals, based on a traveling load associated with the section;
    generating periodically, by the processing circuitry, traveling load information that is referenced; and
    when replanning the traveling mode of the vehicle with the internal combustion engine and the electric motor based on the traveling load information generated, deferring, by the processing circuitry, an execution of the replanning of the traveling mode when a time between a previous planning of the traveling mode and the replanning of the traveling mode is less than a predetermined period, and planning the traveling mode at the regular intervals.

6. The moving assist method according to claim 5, wherein
    a condition of replanning the traveling mode at the irregular intervals, by the processing circuitry, includes any one of conditions that a remaining amount of the battery has changed by more than a predetermined amount, that an operating state of an air conditioner is changed, and that it is a case that a current traveling mode shall be changed.

7. A driving assist system for assisting driving of a vehicle which includes an internal combustion engine and an electric motor as a driving source based on one traveling mode that is selected from a plurality of different traveling modes, wherein the plurality of different traveling modes are traveling modes that are planned for each section obtained by dividing a traveling route of the vehicle from a current position to a destination, the driving assist system comprising:

a moving assist apparatus configured to plan one traveling mode that is selected from the plurality of traveling modes for each section of the traveling route, the moving assist apparatus including:

processing circuitry configured to:

for each section obtained by dividing the traveling route from the current position to the destination, choose one traveling mode of the vehicle with the internal combustion engine and the electric motor from a first mode of not maintaining a charge storage amount of a battery of the vehicle and a second mode of maintaining the charge storage amount of the battery to plan at regular intervals or irregular intervals, based on a traveling load associated with the section;

generate periodically traveling load information that is referenced; and when replanning the traveling mode based on the traveling load information, defer an execution of the replanning of the traveling mode when a time between a previous planning of the traveling mode and the replanning of the traveling mode is less than a predetermined period, and execute planning the traveling mode at the regular intervals.

* * * * *